(12) United States Patent
Kaku et al.

(10) Patent No.: US 7,285,318 B2
(45) Date of Patent: Oct. 23, 2007

(54) PACKAGING MATERIAL AND INFORMATION RECORDING MEDIA PACKAGED BY PACKAGING MATERIAL

(75) Inventors: Toshiyuki Kaku, Miyagi (JP); Takayuki Aneha, Miyagi (JP); Seizo Seki, Miyagi (JP); Yoshitaka Tsukidate, Miyagi (JP)

(73) Assignee: Sony Corporation, Tokyo (JP)

( * ) Notice: Subject to any disclaimer, the term of this patent is extended or adjusted under 35 U.S.C. 154(b) by 371 days.

(21) Appl. No.: 10/381,180

(22) PCT Filed: Sep. 21, 2001

(86) PCT No.: PCT/JP01/08253

§ 371 (c)(1),
(2), (4) Date: Oct. 9, 2003

(87) PCT Pub. No.: WO02/24545

PCT Pub. Date: Mar. 28, 2002

(65) Prior Publication Data

US 2004/0053012 A1    Mar. 18, 2004

(30) Foreign Application Priority Data

Sep. 22, 2000  (JP) .................. P2000-288650

(51) Int. Cl.
*B32B 7/02*  (2006.01)
(52) U.S. Cl. .................. 428/195.1; 428/212; 428/35.2; 428/35.7; 428/411.1; 428/430
(58) Field of Classification Search ............. 428/195.1, 428/212, 35.2, 35.7, 411.1, 430
See application file for complete search history.

(56) References Cited

U.S. PATENT DOCUMENTS 5,458,933 A    10/1995  Suskind
6,153,276 A *  11/2000  Oya et al. ............... 428/35.2
6,706,349 B2 *  3/2004  Eida et al. ............... 428/36.6

FOREIGN PATENT DOCUMENTS

| EP | 1 153 743 | 11/2001 |
| EP | 1 193 294 | 4/2002 |
| EP | 1 340 690 | 9/2003 |
| JP | 11-278536 | 10/1999 |
| JP | 2000-185380 | 7/2000 |
| JP | 2001-180741 | 7/2001 |
| WO | WO92 04410 | 3/1992 |
| WO | WO97 11845 | 4/1997 |
| WO | WO 00 05068 | 2/2000 |

OTHER PUBLICATIONS

Microfilm of the specification and drawings annexed to the request of Japanese Utility Model Application No. 157161/1980 (Laid-open No. 80454/1982), (Hikotsugu ENOMOTO), May 18, 1982, p. 1, lines 4 to 10; Figs. 1 to 6.

* cited by examiner

*Primary Examiner*—Rena Dye
*Assistant Examiner*—Lawrence D. Ferguson
(74) *Attorney, Agent, or Firm*—Frommer Lawrence & Haug LLP; William S. Frommer; Thomas F. Presson

(57) ABSTRACT

The present invention relates to a packing material used for wrapping an article to be packed and sealing and packing the article to be packed by heat-sealing mutually superposed end parts. The packing material is composed of a biodegradable film. Heat sealing agent layers are selectively provided in the heat sealing positions or the heat-sealed parts of the biodegradable film. The heat sealing agent layers are provided on the front surface and the back surface, the front surface and the front surface, or the back surface and the back surface of the mutually superposed biodegradable film when the article to be packed is packed. On the biodegradable film, picture pattern layers as well as the heat sealing agent layers are formed within a range 70% or less as large as the entire area including the front surface and the back surface of the biodegradable film.

12 Claims, 5 Drawing Sheets

PACKAGING MATERIAL AND INFORMATION RECORDING MEDIA PACKAGED BY PACKAGING MATERIAL

TECHNICAL FIELD

The present invention relates to a packing material used for packing an article and an information recording medium using the packing material. More specifically, the present invention relates to a packing material preferably and suitably used for packing a case in which a magnetic recording medium such as a flexible magnetic disc or a magnetic tape, an optical recording medium such as a compact disc (CD) or a DVD (Digital Versatile disc), or a magneto-optical recording medium such as a magneto-optical disc is accommodated, and further to an information recording medium packed by using the packing material.

BACKGROUND ART

As a material for packing a case in which a magnetic recording medium such as a magnetic disc, an optical recording medium such as an optical disc and further a recording medium such as a magneto-optical disc is accommodated, there has been hitherto employed a heat shrinkable film such as a biaxial stretching polypropylene film or a biaxial stretching polyvinyl chloride film. The heat shrinkable film of this type is used to pack the case in which the above-described recording medium is housed, then superpose respective end parts and perform a heat sealing process in the superposed parts so that the case is packed. Further, the entire part of heat shrinkable film which packs the case is heated to heat-shrink the film by several % so that the heat shrinkable film tightly sticks to the outer peripheral surface of the packed case to seal the case.

Now, a procedure for packing the case in which the recording medium is accommodated by using the heat shrinkable film as the packing material will be specifically described below.

In order to pack a case 112 as an object to be packed by using a film type packing material 101, the case 112 is initially mounted on one end side of the spread packing material 101, as shown in FIG. 1A. Then, as shown in FIG. 1B, the case 112 is wrapped by the packing material 101. At this time, the back surface side of an end part 102 in one side of the packing material 101 is superposed on the surface of an end part 103 in the other side. Here, the back surface side means an inside surface opposed to the case 112 side to be packed. The surface side means a surface facing an external part opposite to the case 112 when the case 112 is packed.

Then, a part between the one end part 102 and the other end part 103 of the packing material 101 which are superposed one upon another is heated to perform a heat sealing process (See FIG. 1B). At this time, the packing material 101 is formed in a tubular shape to wrap the case 112 as shown in FIG. 1B.

Subsequently, both the end parts 102 and 103 are superposed together and subjected to the heat sealing process to obtain the packing material 101 in a tubular form. Thus, narrow parts 104 and 105 of the packing material 101 which respectively protrude from both the end faces of the case 112 and correspond to the narrow parts of the case 112 are folded on the end faces of the case 112 as shown in FIG. 1C. Then, the wide parts 106 and 107 of the packing material 101 which respectively protrude from both the end faces of the case 112 and correspond to the wide flat surfaces of the case 112 are folded onto the narrow parts 104 and 105 folded on the end faces of the case 112 and superposed thereon, as shown in FIG. 1D. Then, parts provided in the narrow parts 104 and 105 of and the wide parts 106 and 107 of the packing material 101 superposed respectively on the end faces of the case 112 are heated to perform a heat sealing process as shown in FIG. 1E.

As the heat shrinkable film forming the conventionally employed packing material, there have been used films made of polypropylene, polyvinyl chloride or the like as materials. When the packing material using these materials are thrown away and discarded after it is opened, the packing material may possibly cause an environmental contamination.

Thus, it is studied to compose the packing material of a biodegradable film in place of the above-described materials. However, a stretched biodegradable film does not generally have heat sealing characteristics. Accordingly, in the packing material using the biodegradable film, after an object to be packed is packed by the packing material, superposed parts cannot be heated to perform a heat sealing work. Therefore, when the biodegradable film is used, a packing method similar to that of a case in which the packing material having the above-described heat sealing characteristics cannot be utilized.

In order to make it possible to use the packing material made of the biodegradable film like the conventionally used packing material, may be considered such a method as to previously apply a heat sealing agent to the biodegradable film to form a sealing agent layer and to carry out a heat sealing process by using the heat sealing agent layer.

In the above-described packing manner as shown in FIG. 1, that is, in such a manner as to pack an object to be packed by a packing material by a caramel wrapping method, the front surface and the back surface, the front surfaces and the front surfaces, and the back surfaces and the back surfaces need to be respectively heat-sealed together on the end faces of the case on which the end parts of the packing material are folded from a state in which the packing material is folded.

For realizing such a heat sealing process, it may be suggested that the heat sealing agent layers are formed on the entire surfaces of both the front and back surfaces of the packing material. However, when the heat sealing agent layers are formed on the entire surfaces of both the front and back surfaces of the biodegradable film, the biodegradation characteristics of the biodegradable film will be deteriorated and a sufficient biodegradation capability cannot be exhibited.

Further, in case that the heat sealing agent layers are formed on the entire surfaces of both the surfaces of the packing material and the object to be packed is packaged by this packing material, the heat sealing agent layer will be exposed on the front surface of the packaged object. Thus, there inconveniently arises a problem that the packages are stuck to mutually when they are heated in the course of circulation of products.

DISCLOSURE OF THE INVENTION

It is an object of the present invention to provide a new packing material which eliminates the above-described problems of the conventional packing material and an information recording medium packed by the packing material.

It is another object of the present invention to provide a packing material whose discarding process after opening is easily carried out.

It is still another object of the present invention to provide a packing material which can readily pack an article to be packed by using a heat sealing method.

A packing material according to the present invention proposed to achieve the above-described objects is employed for wrapping an article to be packed and applying a heat sealing process to mutually superposed end parts to seal and package the article to be packed, and is composed of a biodegradable film. Heat sealing agent layers are selectively provided in the heat sealing positions or the heat-sealed parts of the biodegradable film. The heat sealing agent layers are provided on the mutually superposed front surface and back surface, the front surface and the front surface or the back surface and the back surface of the biodegradable film.

In the packing material according to the present invention, since the heat sealing agent layers are selectively provided in the heat sealing positions or the parts to be heat-sealed of the biodegradable film, the rate of an area with which microorganisms can come into contact can be increased and the biodegradation property of the biodegradable film is not prevented.

In the biodegradable film forming the packing material according to the present invention, picture pattern layers are provided as well as the heat sealing agent layers. The picture pattern layers are provided in other parts than parts in which the heat sealing agent layers are provided. In the biodegradable film on which the picture pattern layers are provided, the heat sealing agent layers may be formed after the picture pattern layers are provided. The picture pattern layers may be partly superposed on the heat sealing agent layers.

The heat sealing agent layers and the picture pattern layers provided on the biodegradable film desirably have small areas as much as possible and large parts exposed to outside air as much as possible in order to prevent the resolution of the biodegradable film from being blocked. For example, the biodegradable film desirably has an exposed area of about 30% or more as large as an entire area including the front surface and the back surface. In other words, the heat sealing agent layers and the picture pattern layers are preferably formed so as to be located within a range of an area of about 70% or lower as small as the entire area including the front surface and the back surface of the biodegradable film.

When the packing material composed of the biodegradable film having the picture pattern layers provided in addition to the heat sealing agent layers are heat-shrinked to pack and seal the article to be packed, a slight shear is generated between the biodegradable film having a heat shrinking property and the picture pattern layer of non-shrinking property formed on the film so that the cracks of picture patterns which cannot be recognized with the naked eye or small clearances between the biodegradable film and the picture pattern layer are generated and microorganisms can directly come into contact with the biodegradable film through these cracks or the small clearances to effectively decompose the biodegradable film.

Since the cracks or the clearances through which the microorganisms can come into contact with the biodegradable film are formed by using the difference in coefficient of heat shrinkage between the biodegradable film and the picture pattern layer formed on the biodegradable film, the biodegradable film is made of a heat shrinkable film.

As the biodegradable film having the heat shrinking property, a film having a coefficient of longitudinal heat shrinkage and a coefficient of horizontal heat shrinkage of 0.5% to 20% when it is exposed to an environment at 100° C. for 5 minutes is preferably employed. Preferably, it is desired to use a biodegradable film having a coefficient of longitudinal heat shrinkage and a coefficient of horizontal heat shrinkage of 1% to 10%. Further preferably, it is desired to use a biodegradable film having a coefficient of heat shrinkage of 3% to 9%. These films are employed because picture patterns formed on the biodegradable films are not deformed due to a heat shrinkage.

As the biodegradable film forming the packing material according to the present invention, arbitrary films may be used, however, it is desired to use a polylactic acid film from the viewpoints of a workability of a film deposition, a transparency, a biodegradable performance and a shrinkable performance and so on. The polylactic acid film starts a hydrolysis when both temperature and humidity satisfy prescribed conditions. In the polylactic acid film, molecules which are made compact due to the hydrolysis are caught by the microorganisms so that the hydrolysis further accelerated.

Under an environment of an ordinary circulation process in which packages of recording media packed by the film are circulated, the hydrolysis of the biodegradable film is not started. Especially, when the biodegradable film is left in a compost in which microorganisms live, the biodegradable film is rapidly decomposed. Therefore, the biodegradable film is also advantageously used for the packing material for products distributed in a circulation course for a long period in view of this point.

The present invention is devised by paying attention to the feature of the polylactic acid film as the biodegradable film and the polylactic acid film is employed as the biodegradable film forming the packing material.

As the polylactic acid films which can be utilized for the present invention, there may be enumerated Terramac (trade name) produced by Unitika Ltd., Ecoloju (trade name) produced by Mitsubishi Plastics, Inc. and Palgreen LC (trade name) produced by Tohcello Co., Ltd, etc. These marketed polylactic acid films are stretched so as to have the above-described coefficient of heat shrinkage, so that polylactic acid films preferably usable for the packing material according to the present invention can be obtained.

The polylactic acid film constituting the packing material preferably has its thickness of 5 μm to 100 μm, desirably the thickness of 10 μm to 40 μm and more preferably the thickness of 20 μm to 30 μm. When the thickness of the polylactic acid film is increased, the coefficient of heat shrinkage of the polylactic acid film is apt to be lowered. On the other hand, the thickness of the film is increased, the strength of the film is increased so that the film has such a strength as to endure the package of a heavy article.

When the polylactic acid film is employed as the biodegradable film, a polyester heat sealing agent can be used for a heat sealing agent layer. This heat sealing agent is dissolved in organic solvent such as toluene, methyl ethyl ketone, ethyl acetate or the mixed solvent of them and the obtained mixed agent is selectively applied to the heat sealing positions or the parts to be heat-sealed of the polylactic acid film to form a heat sealing agent layer.

When the heat sealing agent used here is applied to the biodegradable film and is subject to a heat sealing process and the heat sealing agent is peeled off from the film, a principle of peeling is desirably based on an internal failure of the heat sealing agent layer, that is, a cohesive failure.

The amount of application of the heat sealing agent to the biodegradable film is preferably 0.1 g/m$^2$ to 10 g/m$^2$, and more preferably 0.5 g/m$^2$ to 3 g/m$^2$. When the amount of application of the heat sealing agent is low, a desired heat sealing strength cannot be obtained, a partial peeling may be generated and the heat sealing agent layer may be possibly peeled off by a slight impact. The heat sealing strength of about 0.98 to 5.88 N/15 mm is sufficient for the heat sealing strength. On the other hand, when the excessive amount of the heat sealing agent is applied to the film, a blocking that the films stick to each other before articles is packed by the films is generated so that the heat sealing agent layer is hardly peeled off.

The heat sealing agent can be selectively applied to the heat sealing positions or the parts to be heat-sealed of the biodegradable film by, for instance, a method such as a gravure coating method or a comma coating method. The positions where the heat sealing agent is applied, in other words, the positions where the heat sealing agent layers are formed indicate positions superposed one upon another and subjected to the heat sealing process when an article is packed and designate the front surface and the back surface, the front surface and the front surface, or the back surface and the back surface of the biodegradable film which are superposed one upon another.

In the heat sealing agent layer, is provided a cut-out part to which the heat sealing agent is not applied in at least one side of the parts superposed one upon another and heat-sealed. The cut-out part of the heat sealing agent layer is a readily peeled part which is not heat-sealed under a high sealing strength and can be easily peeled off.

The cut-out parts may be respectively superposed mutually and provided at both the sides of heat-sealed parts.

The picture pattern layers formed on the packing material are formed by printing ink layers. Printing ink using for instance, a two component curing type urethane resin as a binder can be used for the printing ink layer. The picture pattern layers can be formed by performing a gravure-printing of printing ink on the of the biodegradable film. Further, multicolor printing ink is overprinted to form a color picture pattern. It is desired to selectively provide the picture pattern layers and the heat sealing agent layers on the biodegradable film and expose a part of the biodegradable film so as to directly come into contact with outside air.

Further, the present invention concerns a packing member for an information recording medium sealed by the packing material made of the biodegradable film on which the heat sealing agent layers are provided and the picture patterns are provided as well as the heat sealing agent layers as mentioned above. The information recording medium packed by this packing member includes a magnetic recording medium such as a flexible magnetic disc or a magnetic tape, an optical recording medium such as a compact disc (CD) or a DVD (Digital Versatile disc), or a magneto-optical recording medium such as a magneto-optical disc, and more specifically, an information recording medium accommodated in a case.

In the packing member for the information recording medium according to the present invention, the information recording medium or the case for housing the information recording medium is covered with the biodegradable film and the end parts of the biodegradable film with which the information recording medium or the case for accommodating the information recording medium are folded and the superposed parts are subjected to a heat sealing process to pack the medium or the case. In the biodegradable film used for the packing member, the heat sealing agent layers are provided on the parts to be superposed one upon another and heat-sealed and the picture patterns are printed on the packed information recording medium or the main surface of the case for accommodating the information recording medium. The sum of areas in which the heat sealing agent layers provided on the biodegradable film are formed and the printing areas of the picture patterns is located within a range 70% or less as large as the entire area including the front surface and the back surface of the biodegradable film. Therefore, about 30% or more as large as the entire area including the front surface and the back surface is exposed. The exposed surface 30% or more as large as the entire surface of the biodegradable film is ensured. Thus, when a hydrolysis is carried out under a natural environment or the biodegradable film is decomposed by using microorganisms, the biodegradable film can maintain a biodegradable performance substantially equal to that of a biodegradable film on which the heat sealing agent layers or the picture pattern layers are not provided.

Other objects of the present invention and specific advantages obtained by the present invention will become more apparent from the description of embodiments which will be described below.

BEST MODE FOR CARRYING OUT THE INVENTION

Figure 1A:
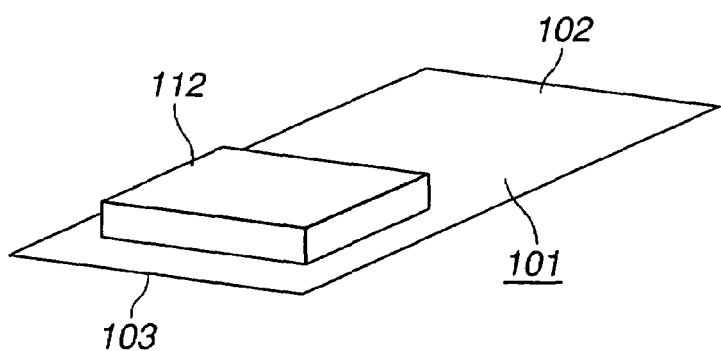
FIGS. 1A to 1E show perspective views showing in order of processes an example for packing a case in which a recording medium is accommodated by using a conventional heat shrinkable film as a packing material.
Figure 1B:
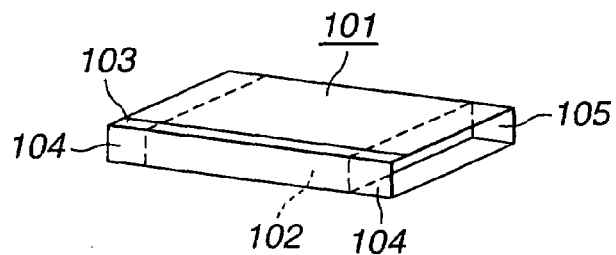
Figure 1C:
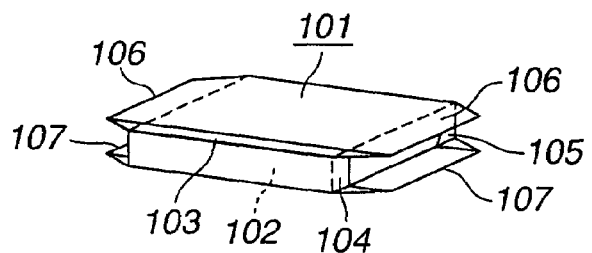
Figure 1D:
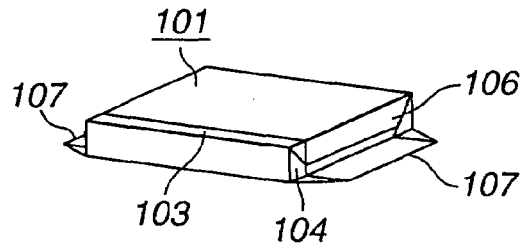
Figure 1E:
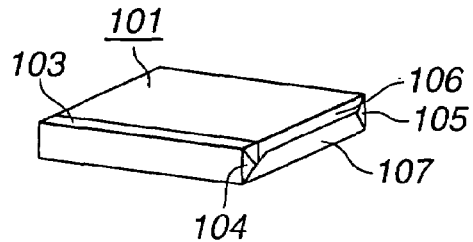

Now, a packing material according to the present invention and specific examples for packing an information recording medium by using the packing material will be described by referring to the drawing.

The packing material according to the present invention is formed by using a biodegradable film. Here, as the biodegradable film, a polylactic acid film produced by Unitika Ltd. was employed. This polylactic acid film has a melting point of 170° C. and the thickness of 25 μm. When the polylactic acid film is stretched and left or exposed under the environment of 100° C. for 5 minutes, a coefficient of longitudinal heat shrinkage of the film is adjusted to be 7% to 9% and a coefficient of horizontal heat shrinkage is adjusted to be 3% to 6%.

Figure 2:
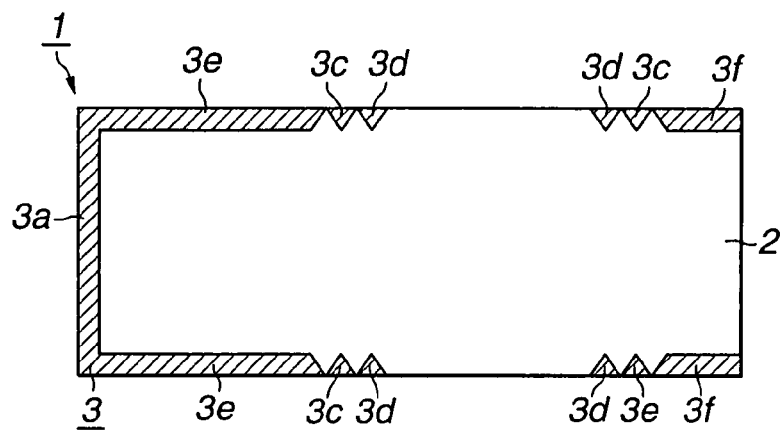
FIG. 2 is a plan view showing the positions of heat sealing agent layers formed on the front surface side of a packing material according to the present invention.
Figure 3:
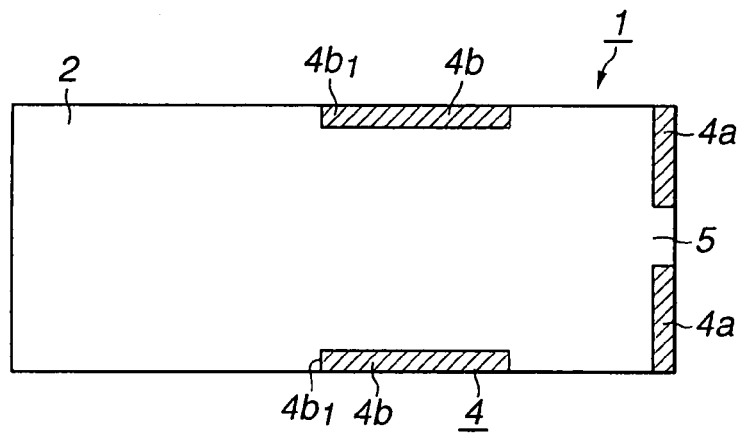
FIG. 3 is a plan view showing the positions of heat sealing agent layers formed on the back surface side of the packing material according to the present invention.
Figure 4:
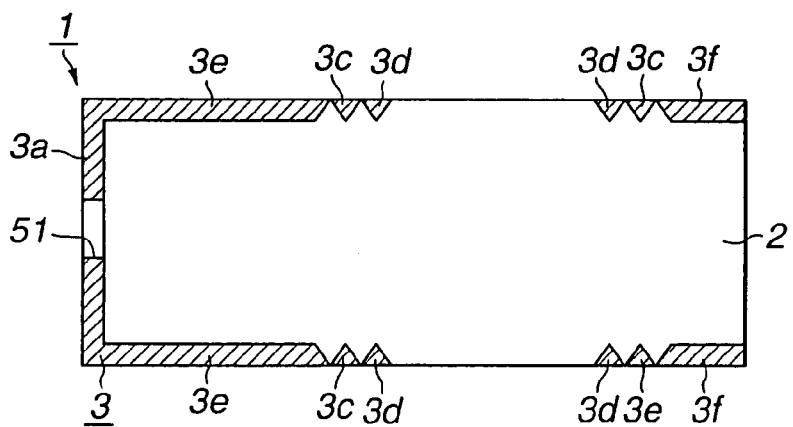
FIG. 4 is a plan view showing another forms of heat sealing agent layers formed on the front surface side of a packing material.

A biodegradable film 2 composed of a polylactic acid film constituting a packing material 1 according to the present invention is formed, as shown in FIGS. 2 and 3, in a long rectangular shape with a size which can pack the entire body of a rectangular case in which an information recording medium is housed by, what is called, a caramel wrapping method. The front surface side of the biodegradable film 2 forming the packing material 1 according to the present invention is gravure-coated with a heat sealing agent by using a gravure printer. Heat sealing layers 3 are formed in such a configuration as shown in FIG. 2. The back surface side of the biodegradable film 2 is also gravure-coated with the heat sealing agent by using the gravure printer and heat sealing agent layers 4 are formed in such a configuration as shown in FIG. 4. On the back surface side of the polylactic acid film 2, colored picture pattern layers which are not illustrated are formed by a gravure-printing method in addition to the heat sealing agent layers 4.

In the packing material 1 shown in FIGS. 2 and 3, the heat sealing agent layers 3 and 4 are formed at the rate of about 10% as large as an area including both the front and back surfaces, and the picture pattern layers are formed so as to be located within a range 60% or less as large as the area including both the front and back surfaces. The heat sealing agent layers 3 and 4 and the picture pattern layers are formed within the above-described range for the purpose of preventing the biodegradable performance of the biodegradable film from being checked.

When the picture pattern layers are formed on the biodegradable film 2, the picture pattern layers are provided by the gravure-printing method before the heat sealing agent layers 3 and 4 are formed. Further, since the picture pattern layers are provided on all the areas of the front and back surfaces of the biodegradable film 2 at the prescribed rate or lower, the heat sealing agent layers 3 and 4 may be superposed on the picture pattern layers. Also in this case, the heat sealing agent layers 3 and 4 and the picture pattern layers are formed within a range 70% or less as large as the area including both the front and back surfaces.

The front surface side of the biodegradable film 2 is a surface facing an external side opposite to the information recording medium or the case in which the information recording medium is packed when the information recording medium or the case for packing it is packaged. The back surface side of the biodegradable film 2 is an inner side surface opposite to the packed object side.

The heat sealing agent layer 3 provided in the front surface side of the biodegradable film 2 is formed, as shown in FIG. 2, on an end edge part 3a along one end side of the biodegradable film 2, parts 3c and 3d for surrounding the corner parts of the case to be packed, and both side edge parts 3e and 3f corresponding to both the side parts of the lower part of the case to be packed.

Further, the heat sealing agent layer 4 provided in the back surface side of the biodegradable film 2 is formed, as shown in FIG. 3, on end edge parts 4a along the other end side of the biodegradable film 2, and both side edge parts 4b superposed on the heat sealing agent layers 3 of the side edge parts 3e of the front surface side. Still further, when parts 4b, in one end sides of both the side edge parts 4b shown in FIG. 3 are subjected to a heat sealing process upon packing the case, they become heat sealed parts on the back surface sides of the biodegradable film 2. The other end edge parts 4a on the back surface side of the biodegradable film 2 are parts to be superposed on one end edge part 3a of the front surface side when the case is packed. On the other end edge parts 4a of the back surface side, the heat sealing agent layer 4 is not formed along the entire width of the biodegradable film 2 and a central part in the direction of width serves as a cut-out part 5 in which the heat sealing agent layer is not provided. Even when the cut-out part 5 is superposed on one end edge part 3a in which the heat sealing agent layer 4 is formed, the cut-out part 5 serves as a non-heat sealing part which is not heat-sealed. Such a non-heat sealing part is provided, so that when the case packed by heat-sealing the packing material 1 is opened, the packing material 1 can be easily peeled off from the case by engaging fingers with the non-heat sealing part.

In the above-described example, since the non-heat sealing part which can be readily stripped off is formed, the cut-out part 5 is provided on the heat sealing agent layer 4 provided in the other end edge part 4a in the back surface side which is superposed on one end edge in the front surface side. However, as shown in FIG. 4, a cut-out part 51 may be provided in the heat sealing agent layer 3 provided in one end edge part 3a in the front surface side of the biodegradable film 2. Further, the cut-out parts 5 and 51 may be respectively provided in both the opposed parts of the heat sealing agent layer 3 provided on one end edge part 3a in the front surface side of the biodegradable film 2 and the heat sealing agent layer 4 provided on the other end edge part 4a in the back surface side which are superposed one upon another. As described above, the cut-out parts 5 and 51 are provided in both the mutually superposed parts, so that these parts become non-joined parts to more easily engage fingers with the packing material 1 by which the case is packed.

The heat sealing agent layers 3 and 4 formed on the biodegradable film 2 are made of any heat sealing agent of ethylene vinyl alcohol-chlorinated polypropylene, ethylene vinyl alcohol, and polyester.

The biodegradable film 2 is gravure-coated with the heat sealing agent dissolved in dilute solvent by using the gravure printer. Then, the coated heat sealing agent is dried to form the heat sealing agent layers 3 and 4.

As the dilute solvent used for diluting the heat sealing agent, there may be employed methyl ethyl ketone, ethyl acetate, toluene, etc. Here, the mixture obtained by mixing methyl ethyl ketone with ethyl acetate in the ratio 1:1 is used. Any heat sealing agent of the above-described agents is diluted at the rate of 50% of the dilute solvent and the biodegradable film 2 is coated with the resultant heat sealing agent.

The heat sealing agent is diluted by the dilute solvent under the above-described condition and the diluted heat sealing agent is applied to, for instance, the biodegradable film 2, and then, dried to form the heat sealing agent layer. A part on which the heat sealing agent layer is formed is subjected to a heat sealing process, and then, the heat-sealed part is peeled off. The principle of peeling off the heat-sealed part is on the basis of a cohesive failure.

The heat sealing agent layer composed of the above described heat sealing agent is different in sealing strength depending on sealing temperature.

Thus, the heat sealing agent of ethylene vinyl alcohol-chlorinated polypropylene is designated as a sealing agent A, the heat sealing agent of ethylene vinyl alcohol is designated as a sealing agent B and the heat sealing agent of polyester is designated as a sealing agent C. The sealing strength of these sealing agents A, B and C were measured.

Figure 5:
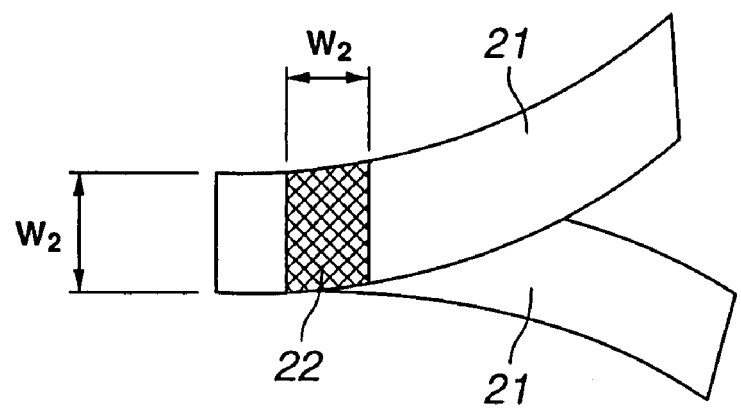
FIG. 5 is a perspective view showing two test pieces heat-sealed to measure the heat sealing strength of a heat sealing agent layer.

Specifically, methyl ethyl ketone and ethyl acetate are mixed in the ratio 1:1 to obtain dilute solvent. Each of the sealing agents A, B and C is diluted to 50% as thin as each concentration by the dilute solvent to prepare a diluted sealing agent. Polylactic acid films serving as test pieces are gravure-coated with the sealing agents A, B and C respectively diluted by the dilute solvent by using the gravure printer. Then, the sealing agents are dried to form the heat sealing agent layers. The two test pieces on which the heat sealing agent layers are formed are subjected to the heat sealing process by with the heat sealing agent layers opposed to each other. The test pieces 21 used at this time are cut into long pieces having width $W_1$ of 15 mm and heat sealing agent layers 22 with width $W_2$ of 10 mm in their base end sides, as shown in FIG. 5.

The amount of application of each of the sealing agents A, B and C with which the polylactic acid film is gravure-coated is set to 4 g/m² after it is dried.

The amount of application of each of the sealing agents A, B and C to the biodegradable film is located within a range of 0.1 g/m² to 10 g/m² and more preferably to a range of 0.5 g/m² to 3 g/m².

Then, while the heat sealing agent layers 22 superposed one upon another are respectively heated at the temperature of 80° C., 100° C. and 120° C., they are heated for 0.5 seconds under the pressure of 0.2 MPa and heat-sealed.

Figure 6:
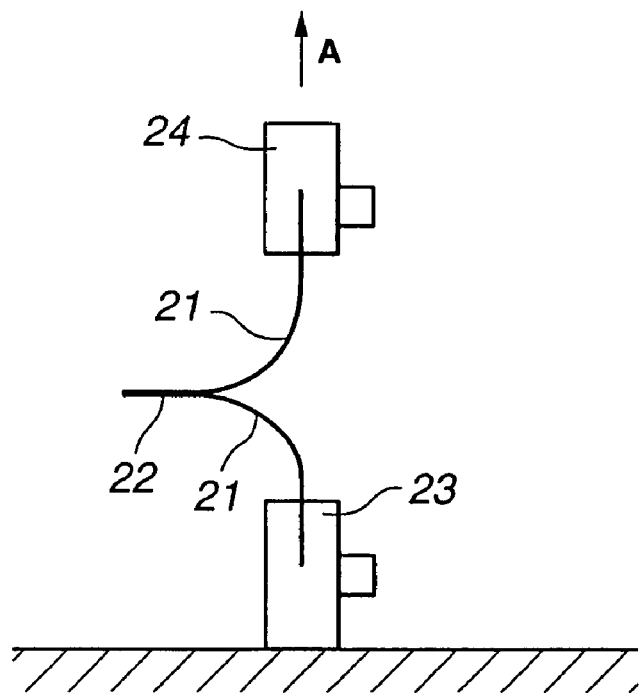
FIG. 6 is a side view showing a state in which the sealing strength of the heat-sealed two test pieces is measured.

In the two test pieces 21 and 21 which are mutually heat-sealed under these conditions, one end side is fixed to a fixed part 23 and the other end side is fixed to a movable part 24, as shown in FIG. 6. Then, when the movable part 24 is moved in the direction so as to tear off the heat-sealed parts at a speed of 300 mm/minute as shown by an arrow mark A in FIG. 6, the sealing strength of the two heat-sealed test pieces 21 and 21 is measured. In the upper part of the movable part, a load cell is provided to output data to a chart and a peak value is measured as the sealing strength.

The sealing strength corresponding to each sealing temperature of the heat sealing agent layers 22 composed of each of the sealing agents A, B and C was obtained as shown in Table 1. The sealing strength shown in the Table 1 indicates power obtained when the heat-sealed parts generate the cohesive failure and its unit is (N/15 mm).

TABLE 1

| Sealing Temperature | Sealing agent A | Sealing agent B | Sealing agent C |
|---|---|---|---|
| 80° C. | 2.2 | 1.7 | 0.1 |
| 100° C. | 2.2 | 2.1 | 5.6 |
| 120° C. | 2.2 | 2.2 | 5.6 |

Some of the heat sealing agents do not generate a large fluctuation owing to the change of the sealing temperature depending on materials to be used, and some of them may greatly change in accordance with the change of the sealing temperature. Some of the articles to be packed need to be controlled so as not to receive high temperature. In order to pack these articles, it is desired to use the heat sealing agent of ethylene vinyl alcohol-chlorinated polypropylene or the heat sealing agent of ethylene vinyl alcohol by which the sealing strength can be obtained to a certain degree even at low temperature.

Further, the article such as the information recording medium including the magnetic disc or the optical disc is packed by the packing material under an environment at high temperature ranging from ordinary temperature to about 80° C. When the packing material on which the heat sealing agent layers are formed is stored in a rolled state under the above-described environment, when a blocking phenomenon that the heat sealing agent layers stick to each other and cannot be peeled off is generated, the packing material cannot be used as an original packing material. While solving such a problem, when slightly high temperature as high as 80° C. is applied to the heat sealing agent layer, it is desired to use the sealing agent which is assuredly heat-sealed with high sealing strength. As the sealing agent used for the packing material 1 employed for the article such as the information recording medium which is not seriously damaged even when the information recording medium is packed under the environment of high temperature ranging from the ordinary temperature to about 80° C. and it is heated to 100° C. or higher and about 130° C., it is desired to use the heat sealing agent of polyester on the basis of the above-described results of the sealing strength.

Further, in the above described various kinds of heat sealing agents, the sealing strength changes in accordance with the amount of application per unit area. For example, in the case of the heat sealing agent of polyester, is obtained the heat sealing strength in accordance with the amount of application as shown in Table 2.

TABLE 2

| Amount of Application | Sealing Strength (N/15 mm) |
|---|---|
| 4 g/m² | 5.6 |
| 3 g/m² | 4.9 |
| 2 g/m² | 4.3 |
| 1 g/m² | 3.7 |

Test pieces to which the polyester heat sealing agent is applied under such conditions as described below are prepared and subjected to a heat-sealing process. Then, the sealing strength of the heat sealing agent is measured.

Specifically, the beat sealing agent of polyester is dissolved in a dilute solvent obtained by mixing methyl ethyl ketone and ethyl acetate in the ratio 1:1 to have the dilute solvent of 50% as thin as first concentration and to prepare the diluted heat sealing agent. Polylactic acid films serving as the test pieces are gravure-coated with the above-described heat sealing agent by using the gravure printer. Then, the heat sealing agents are dried to form heat sealing agent layers. The two test pieces on which the heat sealing agent layers are formed are subjected to the heat sealing process with the heat sealing agent layers opposed to each other. As described above, the test pieces 21 used at this time are cut into long pieces having width $W_1$ of 15 mm and heat sealing agent layers 22 with width $W_2$ of 10 mm in their base end sides, as shown in FIG. 5. The two test pieces 21 are heat-sealed with the heat sealing agent layers 22 opposed to each other, as shown in FIG. 5. The heat sealing process at this time was carried out by heating the parts of the heat sealing agent layers 22 at the temperature of 120° C. and pressing them under the pressure of 0.2 MPa for one second.

In the two test pieces 21 and 21 which are mutually heat-sealed under these conditions, one end side is fixed to a fixed part 23 and the other end side is fixed to a movable part 24, as shown in FIG. 6. Then, when the movable part 24 is moved in the direction so as to tear off the heat-sealed parts at a speed of 300 mm/minute as shown by an arrow mark A in FIG. 6, the sealing strength of the two heat-sealed test pieces 21 and 21 is measured. The sealing strength shown in the Table 2 indicates power obtained when the heat-sealed parts generate the cohesive failure.

As apparent from the results of the Table 2, since the heat sealing agent can select the sealing strength in accordance with the amount of application, a suitable amount of heat sealing agent is applied to an article in accordance with the size and weight of the article to be packed to form the heat sealing agent layers.

As described above, the picture pattern layers which are not shown are formed on the biodegradable film 2 on which the heat sealing agent layers 3 and 4 are formed. The picture pattern layers are formed by using printing ink including two component curing type urethane resin as a binder.

In FIGS. 2 and 3, the illustration of the picture pattern layers is omitted. However, the heat sealing agent layers and the picture pattern layers are formed in such a manner that the entire surface of the biodegradable film 2 made of a polylactic acid film 2 is not covered with the heat sealing agent layers and the picture pattern layers, the sum of the area where the heat sealing agent layers 3 and 4 are formed and the area where the picture patterns are printed is located within a range of 70% or less as large as the entire area including the front surface and the back surface of the biodegradable film 2 and about 30% or more as large as the entire area including the front surface and the back surface is exposed. Here, the sum of the area where the heat sealing agent layers are formed and the area where the picture patterns are printed is determined to be about 70%. That is, when the exposed area of the biodegradable film 2 is about 30% or less as large as the entire area including the front surface and the back surface, the biodegradable film 2 cannot be sufficiently exposed to outside air or microorganisms, so that the biodegradable performance of the biodegradable film 2 cannot be completely realized.

Now, there will be described an example for packing an information recording medium or a case for housing an information recording medium by using the packing material 1 made of the biodegradable film 2 formed as mentioned above.

In this case, the example for packing a case 12 for housing a flexible magnetic disc with the weight of 150 g as the information recording medium to be packed will be explained.

Figure 7A:
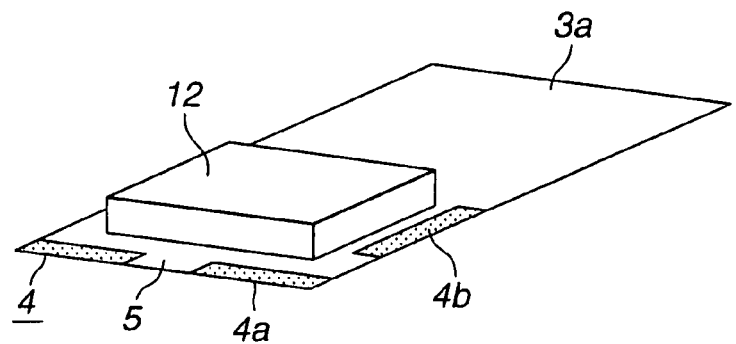
FIGS. 7A to 7E show perspective views showing in order of processes a state in which an information recording medium is packed by using the packing material according to the present invention.
Figure 7B:
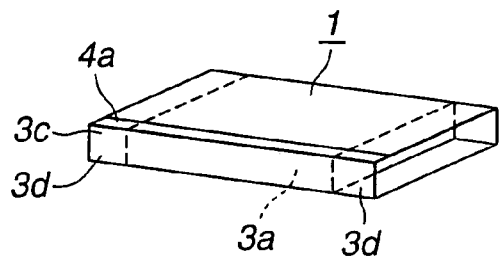

In order to pack this case 2, the case 12 is initially mounted on the other end 4a side of the back surface of the spread packing material 1 as shown in FIG. 7A. Then, the case 12 is wrapped by the packing material 1 as shown in FIG. 7B. At this time, the packing material 1 is folded so that heat sealing agent layers 4 formed on the back surface side in the other end part 4a are superposed on a heat sealing agent layer 3 formed on the front surface of one end part 3a to wrap the case 12.

Here, the back surface side designates an inner side surface opposed to the case 12 side to be packed, as mentioned above. The front surface side is a surface facing an external part opposite to the case 12 when the case 12 is packed.

Then, at least the superposed parts of the heat sealing agent layers 3 and 4 provided on one end part 3a and the other end part 4a of the packing material 1 are heated and subjected to a heat sealing process (see FIG. 7B). At this time, the packing material 1 is formed in a tubular shape as shown in FIG. 7B to wrap the case 12.

On the other end part 4a of the packing material 1, a cut-out part 5 in which the heat sealing agent layer is not provided is formed in the central part in the direction of width. Thus, even when the other end part is superposed on the one end part 3a to be heat-sealed, a part corresponding to the cut-out part 5 is made non-adhesive. The part corresponding to the cut-out part 5 can be used as a part serving to easily open the case 12 packed by the packing material 1.

Figure 7C:
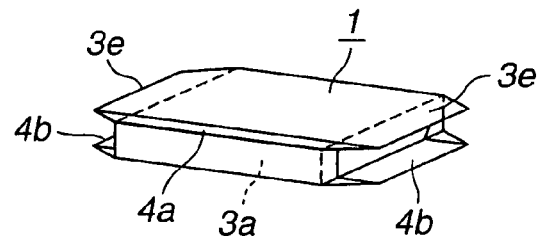

The parts of the packing material 1 formed in the tubular shape for packing the case 12 which respectively protrude from both the end faces of the case 12 and correspond to the small width parts are folded onto the end faces of the case 12 as shown in FIG. 7C. At this time, parts 3c and 3d for wrapping the corner parts of both the end face sides of the case 12 are folded so as to superpose the front surface side on which the heat sealing agent layer 3 is formed thereon. The folded parts on which the heat sealing agent layer 3 is superposed are subjected to a heat sealing process. One end parts $4b_1$ of both the side edge parts 4b of the heat sealing agent layers 4 provided in the back surface side of the biodegradable film 2 are heat-sealed between the back surface and the back surface.

Figure 7D:
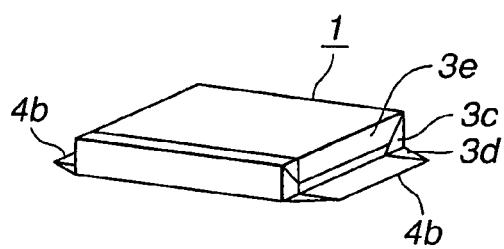

Subsequently, the side edge parts 3e and 3e of the packing material 1 which respectively protrude from both the end faces of the case 12 and correspond to the wide flat surfaces of the case 12 are folded on the end faces of the case 12 as shown in FIG. 7D. Then, side edge parts 4b and 4b are further folded so as to be superposed on the side edge parts 3e and 3e. At this time, the heat sealing agent layers 3 formed on the front surface sides of the side edge parts 3e and 3e are directly superposed on the heat sealing agent layers 4 formed in the back surface sides of the side edge parts 4b and 4b. The parts where the heat sealing agent layers 3 are superposed on the heat sealing agent layers 4 are subjected to the heat-sealing process, so that the case 12 is packed by the packing material 1.

The heat sealing process of the parts where the heat sealing agent layers 3 were superposed on the heat sealing agent layers 4 was carried out under a condition that heat of 100° C. was applied to the heat sealing agent layers with the pressure of 0.2 MPa for one second. At this time, the heat sealing strength is 2.45 N/15 mm.

A package 11 obtained by packing the case 12 by the packing material 1 made of the polylactic acid film was substantially entirely heated by an infrared ray heater to heat-shrink the packing material 1 by 0.1% to 5% and tightly bind the packed case 12. At this time, the package including the part corresponding to the cut-out part 5 which was located in the central part of the end face side of the case 12 and was not provided with the heat sealing agent layers 3 was not opened and a good packaged state could be maintained.

Figure 7E:
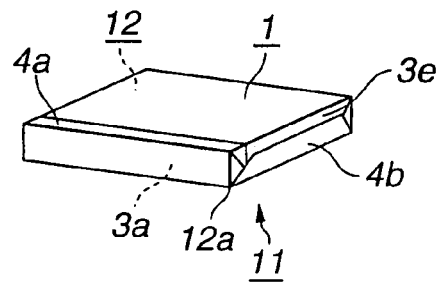

The package 11 obtained by packing the case 12 by heat shrinking the packing material 1 as described above was naturally dropped on a concrete floor surface from the height of 1 m to examine whether or not the heat-sealed parts were peeled off. Upon dropping, the package 11 was inclined slantwise and dropped so that a corner part 12a as shown in FIG. 7E collided with the concrete floor surface. The package 11 dropped and colliding with the concrete floor surface as described above does not generate any peeling. Form this fact, it could be recognized that the heat-sealed and packed package 11 of the present invention was not peeled off under a slight impact.

As described above, the peeling and biodegradable performance of the packing material 1 subjected to a heat sealing process to pack the case 12 was recognized. The packing material 1 heat-sealed to pack the case 12 can be readily peeled off by engaging fingers with the cut-out part 5 in which the heat sealing agent layers 3 and the heat sealing agent layers 4 are not provided.

The biodegradable performance was recognized by comparing the polylactic acid film on which the heat sealing agent layers or the picture patterns were not provided with the packing material 1 according to the present invention composed of the polylactic acid film in which the sum of the area where the heat sealing agent layers 3 and 4 were formed and the area where the picture patterns were printed was 70% as large as the entire area of the packing material 1.

Figure 8:
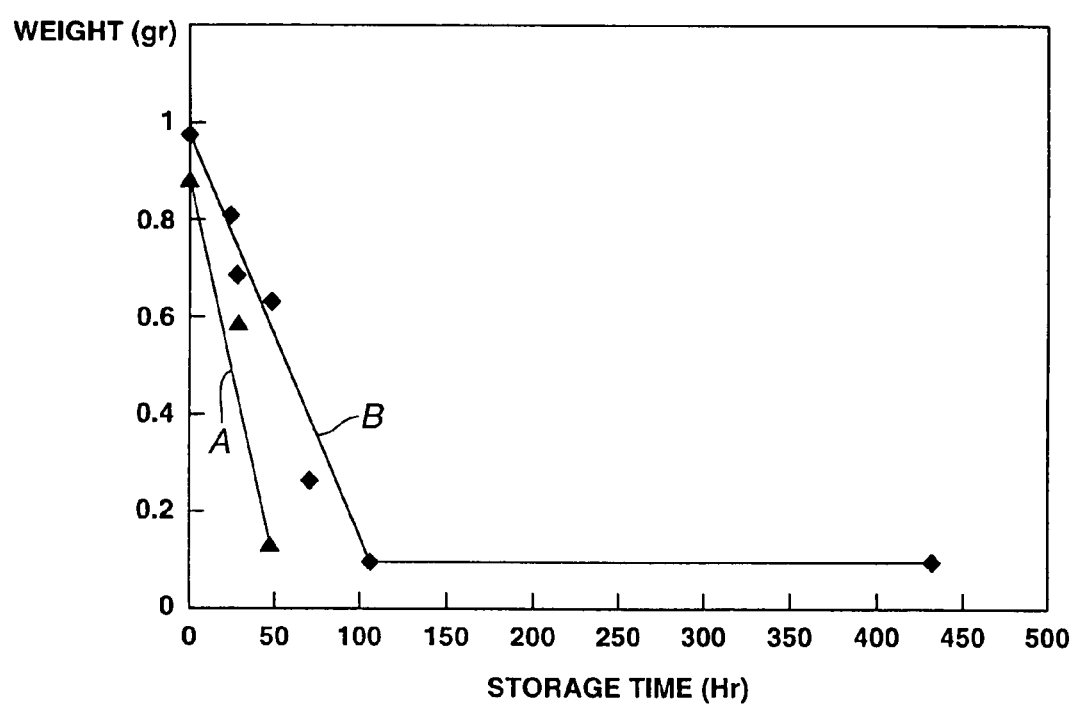
FIG. 8 is a characteristic view showing the biodegradable performance of the packing material according to the present invention in comparison with that of a biodegradable film simple substance having no heat sealing agent layers nor picture pattern layers.

The polylactic acid film having no printing and the packing material 1 according to the present invention were buried in the depth of about 30 cm from the surface layer of compost fermented at the temperature of 80° C. to recognize the biodegradable performance. The obtained results were states as shown in FIG. 8. As shown by A in FIG. 8, in the polylactic acid film having no printing, the residue of about 0.9 g was reduced to about 0.1 g with the lapse of 50 hours. As shown by B in FIG. 8, in the packing material 1 according to the present invention, the residue of about 1 g was decreased to about 0.1 g after about 100 hours. The residue of the packing material 1 according to the present invention seems to be the heat sealing agent applied to the packing material 1 and the printing ink forming the picture patterns. As described above, the packing material 1 according to the present invention cannot be decomposed in a biodegradable manner more rapidly than the polylactic acid film having no printing, however, the packing material 1 can be decomposed in the compost fermented in the substantially same time and annihilated. This biodegradable work is carried out by the action of microorganism in the compost.

In the above-described package 11, although the heat sealing agent layers 3 and 4 are provided on the polylactic acid film and the heat sealing agent layers 3 and 4 are subjected to a heat sealing process to pack an object to be packed such as the case 12 for housing the information recording medium, both the front and back surfaces or any one surface of the front and back surfaces may be subjected to a corona discharge process, in place of providing the heat sealing agent layers, to activate them and the activated surfaces may be employed to apply a heat sealing process thereto similarly to the packing material 1 made of the polylactic acid film and provided with the above-described heat sealing agent layers 3 and 4 to pack the case 12.

The heat sealing process at this time was carried out under a condition that heat of 120° C. was applied under the pressure of 0.2 MPa for one second. The heat sealing strength at this time was 1.475 N/15 mm. Such a packing material is satisfactorily used for packing a light article to be packed. However, when it was used for packing the case 12 for housing a flexible magnetic disc with the weight of 150 g, the packing strength with high reliability could not be obtained. In the case of a package using the polylactic acid film subjected to the corona discharge process to activate surfaces, when the package was naturally dropped on the concrete floor surface from the height of 1 m under the same conditions as described above to recognize the peeling-off of the heat sealed parts, the heat sealed parts were peeled off.

In the above description, although the case 12 for housing the flexible magnetic disc is described as the example, the present invention may be advantageously applied to a magnetic recording medium such as a magnetic tape as well as the flexible magnetic disc, an optical recording medium such as a compact disc (CD) or a DVD (Digital Versatile disc), or a magneto-optical recording medium such as a magneto-optical disc and further used to pack an information recording medium accommodated in the case.

Especially, since the heat sealing agent layers 3 and 4 provided on the package 11 do not break the polylactic acid film and are composed of any of the heat sealing agents of ethylene vinyl alcohol-chlorinated polypropylene, ethylene vinyl alcohol, and polyester heat-sealed at the temperature of about 100° C., which does not give a thermally adverse effect to the information recording medium to be packed, the information recording medium packed by the packing material is not broken and can be packed under an assured protection.

INDUSTRIAL APPLICABILITY

As mentioned above, since the packing material according to the present invention is made of a biodegradable film and heat sealing agent layers are provided only in the heat sealing positions of the biodegradable film or the areas including the heat sealing positions, remaining parts can be exposed to outside air or microorganisms which decompose the biodegradable film and the biodegradable film can be assuredly biodegraded without interrupting a biodegradable performance.

Further, since the picture pattern layers provided in addition to the heat sealing agent layers are formed within a prescribed range of the entire area of the biodegradable film, the biodegradable film can be assuredly biodegraded without obstructing the biodegradable performance.

Still further, since a heat shrinkable film is used as the biodegradable film, slight shears are generated between the biodegradable film and the non-shrinkable picture pattern layers upon its shrinkage, very small cracks are generated on the picture pattern layers or clearances are generated between the biodegradable film and the picture pattern layers. Thus, the microorganisms can come into contact with the biodegradable film through these cracks or the clearances to effectively decompose the biodegradable film.

The invention claimed is:

1. A packing material for wrapping an article to be packed by heat-sealing end parts superposed one upon another to pack the article to be packed, wherein the packing material is composed of a biodegradable film and heat sealing agent layers are selectively provided in mutually superposed and heat-sealed positions or areas including the heat-sealed positions when the article to be packed is packed,
    wherein the heat sealing agent layers are formed by dissolving any heat sealing agent of ethylene vinyl alcohol-chlorinated polypropylene, ethylene vinyl alcohol, or polyester in an organic solvent and selectively applying the obtained heat sealing agent on the heat sealing positions of the biodegradable film or the heat-sealed parts,
    wherein picture pattern layers are provided on the biodegradable film as well as the heat sealing agent layers,
    wherein the heat sealing agent layers and the picture pattern layers are formed within a range of 70% or less as large as the entire area including the front surface and the back surface of the biodegradable film and about 30% or more as large as the entire area including the front surface and the back surface is exposed.

2. The packing material according to claim 1, wherein the heat sealing agent layers are provided on the front surface and the back surface, the front surface or the back surface of the biodegradable film which are mutually superposed.

3. The packing material according to claim 1, wherein the biodegradable film is a polylactic acid film.

4. The packing material according to claim 3, wherein the polylactic acid film has the thickness of 5 μm to 100 μm.

5. The packing material according to claim 1, wherein the polyester heat sealing agent is applied to the biodegradable film within a range of 0.1 g/m2 to 10 g/m2.

6. The packing material according to claim 2, wherein a cut-out part to which the heat sealing agent is not applied is provided in at least one side of the mutually superposed and heat-sealed parts on the heat sealing agent layers.

7. A packing material for packing an information recording medium or a case for accommodating the information recording medium, wherein the packing material is composed of a biodegradable film and is cut into pieces of size enough to pack the information recording medium and heat sealing agent layers composed of polyester heat sealing agent are selectively provided in mutually superposed and heat-sealed positions or areas including the heat-sealed positions when the information recording medium is packed,
wherein picture pattern layers are provided on the biodegradable film as well as the heat sealing agent layers,
wherein the heat sealing agent layers and the picture pattern layers are formed within a range of 70% or less as large as the entire area including the front surface and the back surface of the biodegradable film and about 30% or more as large as the entire area including the front surface and the back surface is exposed.

8. The packing material according to claim 7, wherein the biodegradable film is a polylactic acid film.

9. The packing material according to claim 8, wherein the polylactic acid film has the thickness of 5 μm to 100 μm.

10. An information recording medium covered with a biodegradable film and packed by heat-sealing the folded and superposed parts of the end parts of the biodegradable film, wherein heat sealing agent layers are provided in the mutually superposed and heat-sealed parts and picture pattern layers are provided in a part facing the main surface of the packed information recording medium or a case for housing the information recording medium in the biodegradable film, and the sum of the area where the heat sealing agent layers are formed and the area where the picture pattern layers are printed, which are provided in the biodegradable film, is located within a range 70% or less as large as the entire area including the front surface and the back surface of the biodegradable film and about 30% or more as large as the entire area including the front surface and the back surface is exposed.

11. The information recording medium according to claim 10, wherein the biodegradable film is a polylactic acid film.

12. The information recording medium according to claim 10, wherein the polylactic acid film has the thickness of 5 μm to 100 μm.

* * * * *